US007029225B2

(12) United States Patent
Zimmermann

(10) Patent No.: US 7,029,225 B2
(45) Date of Patent: Apr. 18, 2006

(54) STACKING TRAY FOR FLAT MAIL ITEMS

(75) Inventor: Armin Zimmermann, Constance (DE)

(73) Assignee: Siemens Aktiengesellschaft, München (DE)

( * ) Notice: Subject to any disclaimer, the term of this patent is extended or adjusted under 35 U.S.C. 154(b) by 292 days.

(21) Appl. No.: 10/612,971

(22) Filed: Jul. 7, 2003

(65) Prior Publication Data

US 2004/0161328 A1 Aug. 19, 2004

(30) Foreign Application Priority Data

Jan. 31, 2003 (DE) ................................ 103 03 979

(51) Int. Cl.
*B65G 57/00* (2006.01)

(52) U.S. Cl. ................................ 414/789.9; 414/790.2

(58) Field of Classification Search ............ 414/789.9, 414/790.2, 790.3, 790.5
See application file for complete search history.

(56) References Cited

U.S. PATENT DOCUMENTS 4,359,304 A * 11/1982 Trudeau .................. 414/798.9
4,531,344 A * 7/1985 Sato et al. ..................... 53/447
5,044,877 A * 9/1991 Constant et al. ......... 414/798.9
5,211,389 A * 5/1993 Roch et al. ................. 271/207
5,360,316 A * 11/1994 O'Mara et al. .......... 414/798.9
5,682,973 A * 11/1997 Holmes et al. ............. 198/534
5,727,925 A * 3/1998 Ozawa et al. ............ 414/795.3
5,921,538 A * 7/1999 Schlough ................. 270/52.18
6,302,638 B1 * 10/2001 Eggebrecht et al. ..... 414/798.7
6,708,968 B1 * 3/2004 Honegger ................ 270/58.12
6,845,860 B1 * 1/2005 Walker ....................... 198/433

FOREIGN PATENT DOCUMENTS

WO WO 97/36523 10/1997

OTHER PUBLICATIONS

Derwent Abstract—JP 09086771A; Mar. 31, 1997; Toshiba Corporation; Japan.

* cited by examiner

*Primary Examiner*—Richard Ridley
(74) *Attorney, Agent, or Firm*—Siemens AG; J. Eisenberg

(57) ABSTRACT

The present invention relates to a receiving area or stacking tray for items. The stacking tray may be flat and the items mail items. The mail items may also be flat. The flat mail items are accommodated in an upright position. The receiving area has a stacking base, a stacking location, and a stack-retaining stack support which is movable in approximately horizontal stacking direction. Preceding the stacking location in the direction of stacking there is disposed, a driven pusher unit, likewise movable in the direction of stacking, for emptying the tray, for which purpose the drive of the pusher unit can be controlled such that the pusher unit rapidly slides the stack out over the stacking base and the drive of the stack support can be controlled such that the stack support covers a larger distance than the pusher unit in the course of the emptying process.

25 Claims, 3 Drawing Sheets

STACKING TRAY FOR FLAT MAIL ITEMS

CONTINUATION DATA

The present application claims priority to German Patent Application DE 10303979.1, filed Jan. 31, 2003, which is herein incorporated by reference.

BACKGROUND OF THE INVENTION

The present invention relates to a stacking tray for items. The stacking tray may be narrow and the items may be mail items. The mail items may further be flat. The stacking tray includes a receiving area defined by a base and lateral side walls which cooperate to form the area for accommodating the items therein.

One application for the sorting arts is the sorting of mail items. A latter and perhaps final sorting sequence often entails sorting items by address according to a select delivery route. Given a large number of deliver addresses in a delivery route and the need to sort mail items to each of said addresses, stacking trays assigned to each destination address are accordingly small and/or narrow. Therefore, for practical operating purposes, the stacking trays must be emptied relatively quickly and efficiently. The quickness is to ensure that the sorted mail items are not deformed and the efficiency entails that the stack remain in order of sort.

Mail items are often accommodated in an upright position. Stacking trays accommodating such items have traditionally been emptied manually, i.e. the stack support has been swung upward and the stack held by the operator and slid onto a mail receptacle or into a container.

This manual operation includes several drawbacks, including the limitations associated with manual labor. Such limitations include human error, human fatigue, inconsistent handling of mail items, costs and other resources associated with continuous staffing, and so forth. Accordingly, a need exists in the art for a method and apparatus wherein such stacking trays are emptied in a controlled and automated manner.

SUMMARY OF THE INVENTION

An object of the present invention is to create a generic narrow stacking tray which can be emptied quickly and automatically and which permits transportation of the stack of mail from successive stacking trays with optimum retention of the stack formation for further processing. The present invention may, of course, be used for other items besides flat mail items as would be envisioned by one skilled in the art. The present invention will be described with respect to use with flat mail items.

This and other objects are achieved by the present system and method wherein, ahead of the stacking location in the direction of stacking there is disposed a movable, driven pusher unit for emptying the stacking tray. For emptying, the pusher unit drive can be controlled in such a way that the pusher unit moves up to the narrow stack and rapidly slides the stack out over the stacking base and the stack support drive can be controlled in such a way that the stack support covers a greater distance than the pusher unit in the course of the emptying process. As a result, the narrow stack is rapidly pushed out of the stacking tray over the stacking base. During emptying, jamming of the stack between the pusher unit and stack support is eliminated so that the stack can drop down.

Thus it is advantageous to provide, in the stacking tray, a level sensor which produces an emptying signal when a specified stack thickness and/or number of mail items is reached. This emptying signal is transmitted to the drive controls of the pusher unit and initiates the appropriate movement processes, thereby preventing the relevant stacking tray from overflowing.

It is also advantageous if a receiving mechanism to collect the stack of mail from the stacking tray is provided outside the tray at its open end in the stacking direction.

In addition, it is particularly advantageous that the pusher unit drive can be controlled in such a way that, at the open end of the stacking tray, usually defined by an edge to a base, an acceleration is exerted on the pusher unit and therefore on the stack of mail items which permits no significant deformation within the stack due to the mass inertia of the mail items and the friction between the mail items during displacement of the stack out over the end of the stacking base and during its drop onto the receiving mechanism. For a plurality of stacking trays it is advantageous to provide, as a receiving mechanism, a sectional conveyor inclined from the vertical in the emptying direction for transporting the stack of mail items to the distribution unit, there being disposed at the lower lateral boundary of the sectional conveyor a narrow conveyor belt inclined at an angle of approximately 90° on which the mail items are supported by their narrow sides, thereby ensuring that the alignment and orientation of the mail items with respect to one another is maintained. Until such time as all the stacking trays have been emptied, the section conveyor may be stationary, with generally one stacking tray being assigned to each section. When all the stacking trays have been emptied onto the sectional conveyor, the conveyor is set in motion.

The present invention further comprises An apparatus for accommodating items, comprising: a base for supporting said items, said base comprising walls defining an edge and a drop; a first drive; a first wall for providing rear lateral support to said items, said first wall functionally associated with said first drive such that when engaged said first drive causes said first wall to move in a lateral direction past edge; a second drive; a second wall for providing front lateral support, said second wall functionally associated with said second drive so as to move said second wall in response to an incoming item, and said second drive functionally associated with said first drive so as to move said second wall in concert with said first wall such that said items are pushed past said edge; and a receiving area for accommodating said items, said area defined by cooperation of said first wall, said second wall, and said base.

The present invention still further comprises a method for emptying a stacking tray, comprising the steps of: receiving items in a receiving area, said area defined by a first and second side driven lateral side wall and base running therebetween, said base further comprising walls defining an edge and a drop; moving said second wall laterally away from said first wall so as to accommodate newly arriving items in said receiving area; monitoring when a select number of items or total items thickness is accommodated within said receiving area; laterally displacing said first and second wall along said base such that items within said receiving area are pushed past said edge and caused to drop from said base when a preselect number of items or total thickness of items is monitored.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, wherein

DETAILED DESCRIPTION OF THE INVENTION

Figure 1:
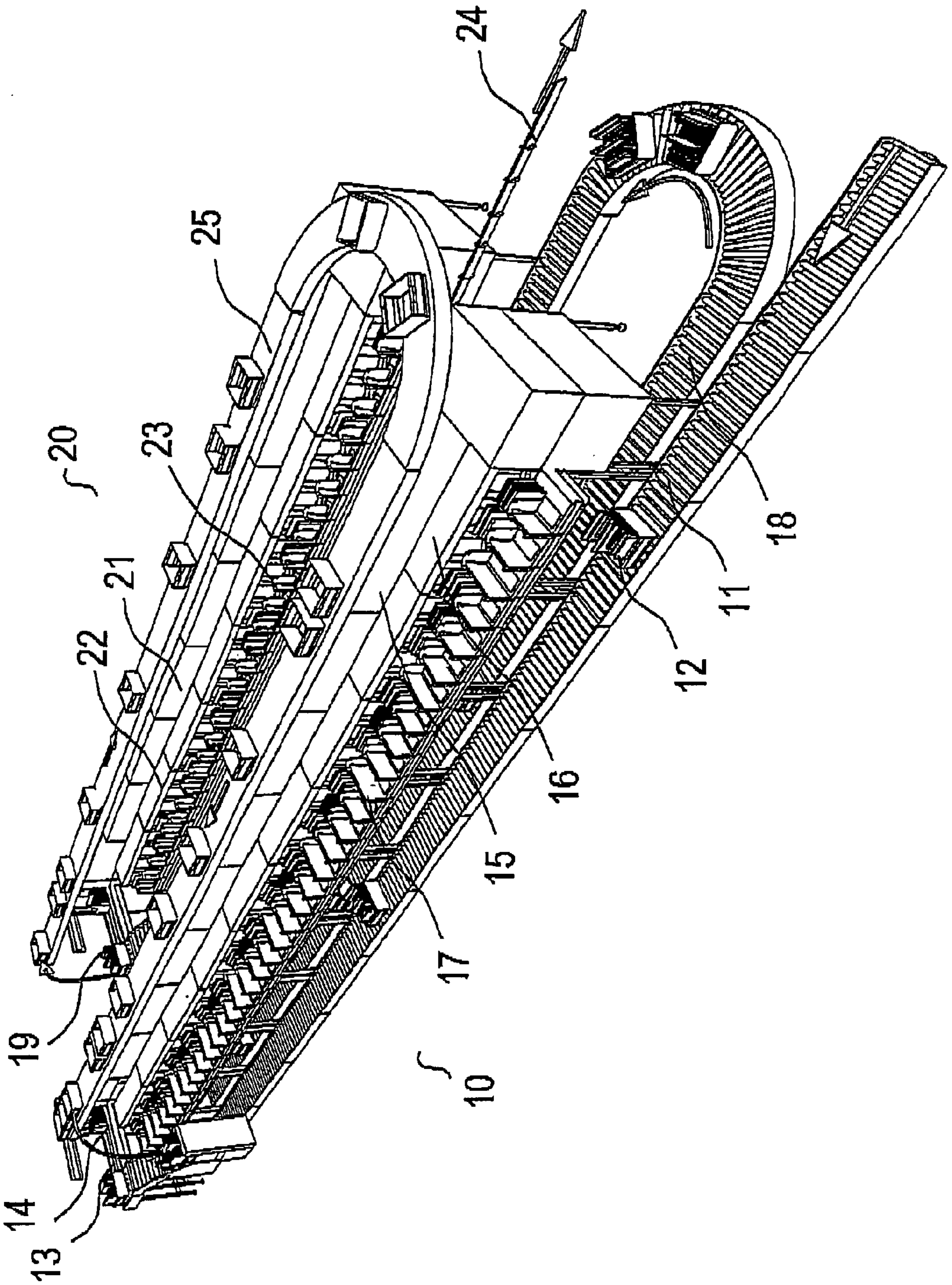
FIG. 1 depicts a perspective view of two cascaded sorting machines in which the mail items are conveyed to stacking trays via sorting gates.

With reference to FIG. 1, mail items for a specific zone are to be sorted to individual delivery points. This takes place on two sorting machines 10,20 in which the mail items are fed to the end points via sorting gates. Mail containers 12 with mail items of the delivery zone are fed via a roller conveyor track 11 to the input portion of the first sorting machine 10, comprising a feeder bed 13 and a singling device 14. There they are unloaded and the mail items are placed on the feeder bed 13 in an upright position. The stack of mail items is then gradually pushed to the singling device 14 where the front most mail item is pulled off. When the destination address has been aligned and read, the singled mail items are fed via a letter run 15 to the sorting section 16 in which the mail items are sorted via gates controlled according to the read destination address into adjacent end points implemented as stacking trays 17. Each stacking tray 17 is assigned to a specific group of delivery points.

If all the mail items for the current zone have been sorted away, the stacking trays 17 are emptied into mail containers 12 which are then transported via another roller conveyor 18 to the input portion 19 of the second sorting machine 20. In this sorting machine 20, after the letter run 21, the mail items are sorted group by group to the individual delivery points in delivery sequence order it the sorting section 22, i.e. the serially adjacent end points implemented as stacking trays 23 are assigned to the delivery points in delivery sequence order. The emptied mail containers 12 are again fed via an upper conveyor track 25 to the first sorting machine 10 in order to load in the sorted mail item groups from the stacking trays 17. As each delivery point 20 is assigned a stacking tray 23 in the second sorting machine, and therefore the mail volume for each stacking tray 23 is relatively low, they have a limited capacity (approx. 30–50 mm length).

As both the destination addresses and the thickness of each mail item is determined in the first sorting machine 10, it is therefore also known if the total thickness of the mail items exceeds the capacity of a stacking tray. In this case two or more stacking trays are assigned to this delivery point.

Figure 2A:
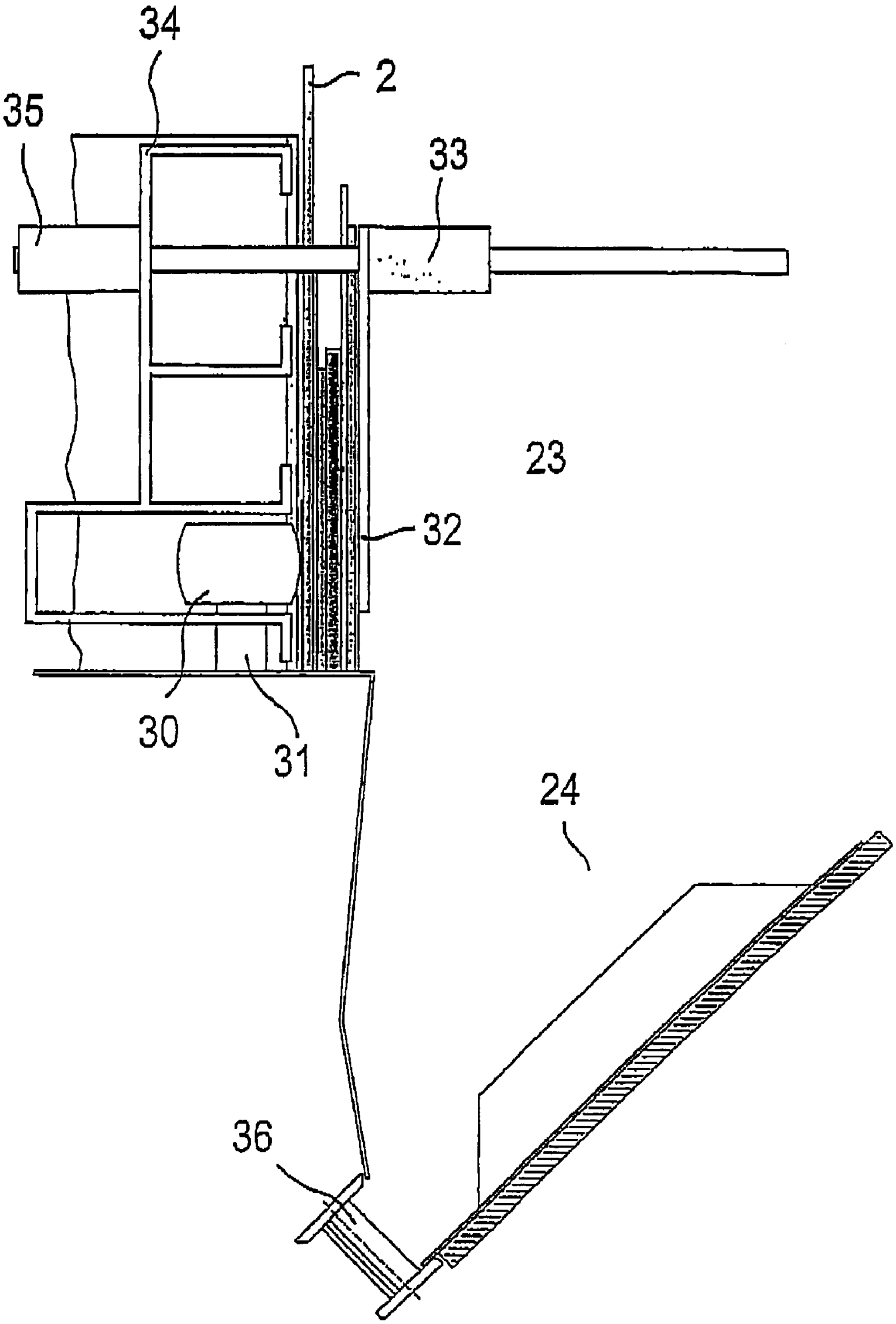
FIGS. 2*a* and 2*b* depict a lateral cross-section through a stacking tray with emptying device and sectional conveyor taking away the sorted stacks of mail items.
Figure 2B:
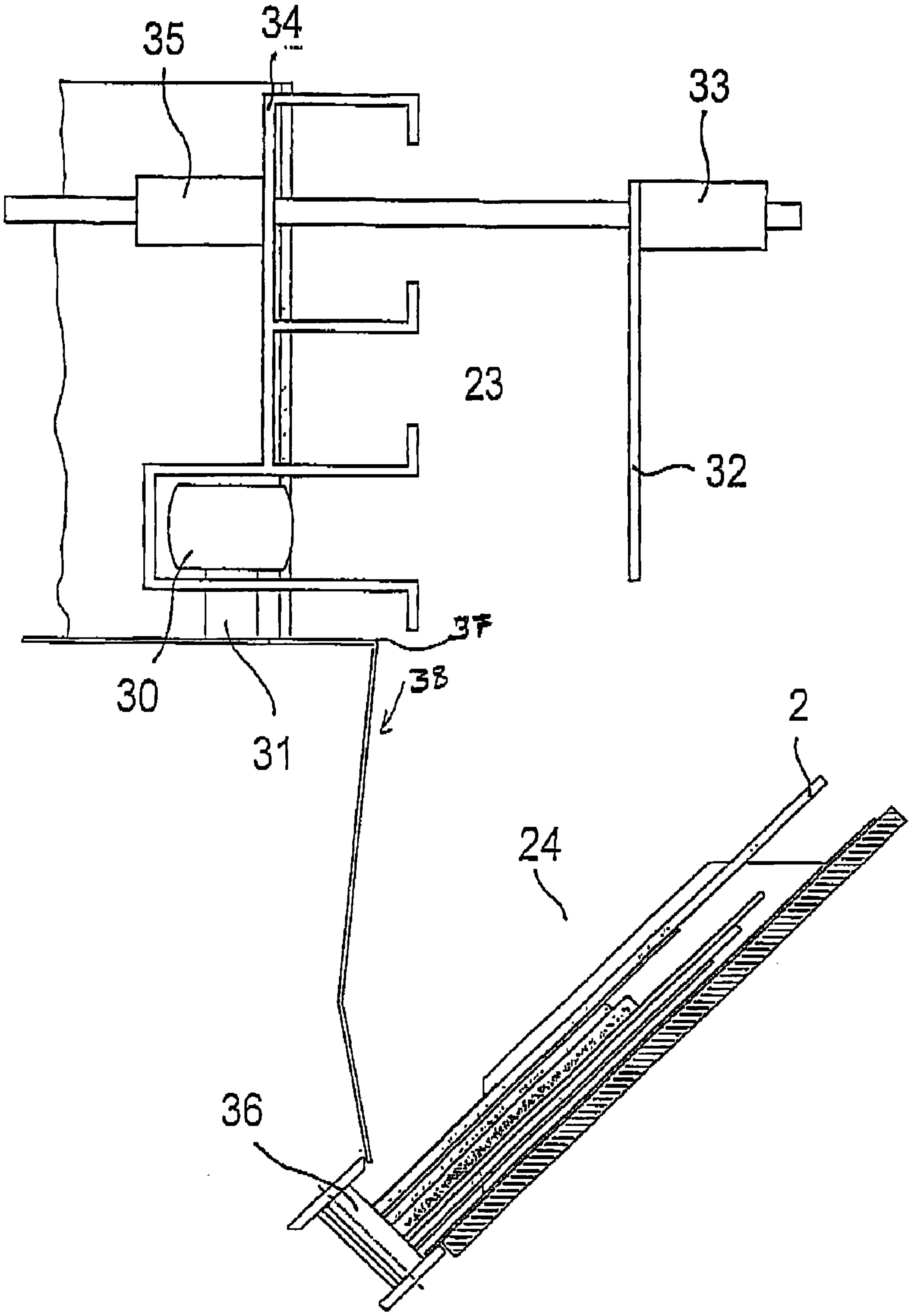

Emptying of the stacking trays 23 containing upright mail items on the sectional conveyor 24 takes place automatically and is illustrated in further detail in FIGS. 2*a* and 2*b*.

As can be seen, the mail items 2 are conveyed sideways into the stacking tray 23 as end point using a stacking roller 30 at the stacking location as far as a deflector wall (not shown) where they are held in the upright position on the stacking base 31 by a driven stack support or second wall 32. The tray 23 includes a base upon which the mail items stand. The base comprises walls defining a lateral and edge 37 and drop 38. To improve the stacking process, other means aside from the stacking roller 30 can be used, as described e.g. in EP 0 143 818 B1. As the stack thickness increases, the stack support 32 moves away from the stacking location according to the measured mail thickness (driven by a drive 33 of the stack support 32) or according to a certain stack pressure against the resilience of a spring (not shown) (max. travel=tray depth). If all the supplied mall items 2 are in the stacking tray 23, the stack support 32 and an idle pusher unit or first wall 34 preceding the stacking location are simultaneously moved out away from the stacking location via the open end of the stacking tray 23. Hence, the first wall 34 may be considered a front wall and second wall 32 may be considered a rear wall in the direction of movement described herein.

The relatively rapid motion of the stack support 32 and of the pusher unit 34 is generated by appropriate drives 33,35, the stack support 32 covering a comparatively large distance and thereby preventing the stack from jamming. The drives 33,35 can be implemented in the known manner, e.g. as a linear drive or as a rack-and-pinion drive. The pusher 34 unit is implemented such that a force can be applied as evenly as possible to the surface of all mail item formats. Due to the rapid motion and the resulting abrupt application of force to the stack, the latter is pushed over the edge 37 of the short tray base 31 without significant deformation due to the force of inertia. As jamming of the stack is eliminated, the stack drops (38) as the result of gravity onto the idle sectional conveyor 24 located outside the stacking trays 23 below the stacking bases 31 and inclined from the vertical in the unloading direction for transporting the mail stack in the sections to the distribution unit. To ensure that the mail items do not slip down from the sectional conveyor 24, at its lower lateral boundary a narrow roller track 36 inclined at an angle of approximately 90° is disposed on which the mail items 2 are supported with their narrow sides. As soon as all the stacking trays 23 have been emptied, the sectional conveyor 24 is set in motion until all the mail stacks have been transferred to the distribution unit.

A controller (not shown) may also be provided to control the drives 33, 35 of the first and second wall 34, 32, so that the two may be made to act in concert. A level sensor may also be provided (not shown) which interacts with the controller to indicate when the tray requires emptying.

The invention being thus described, it will be obvious that the same may be varied in many ways. The variations are not to be regarded as a departure from the spirit and scope of the invention, and all such modifications as would be obvious to one skilled in the art are intended to be included within the scope of the following claims.

I claim:

1. An apparatus for accommodating items, comprising:

a base for supporting said items, said base having an edge and a drop that define a ledge;

a first drive;

a first wall for providing rear lateral support to said items, said first wall functionally associated with said first drive such that when engaged said first drive causes said first wall to move in a lateral direction past edge;

a second drive;

a second wall for providing front lateral support, said second wall functionally associated with said second drive so as to move said second wall in response to an incoming item, and said second drive functionally associated with said first drive so as to move said second wall in concert with said first wall such that said items are pushed past said edge; and a receiving area for accommodating said items, said area defined by cooperation of said first wall, said second wall, and said base.

2. The apparatus according to claim 1, wherein said second wall moves a further distance than said first wall.

3. The apparatus according to claim 1, wherein said first wall and said second wall are substantially parallel.

4. The apparatus according to claim 1, further comprising a conveyor belt comprising a plurality of walled sections, said sections positioned proximate to said edge and drop whereby items pushed past said edge drop from said receiving area and arrive within one of said sections in an order in which said items were received in said receiving area.

5. The apparatus according to claim 4, wherein said conveyor further comprises a roller track facilitating stacking of said items in said sections.

6. The apparatus according to claim 1, wherein said second drive is operable to maintain a select pressure between said second wall and said items.

7. The apparatus according to claim 1, wherein said items are stacked.

8. The apparatus according to claim 1, wherein said items are mail pieces.

9. The apparatus according to claim 1, wherein said items are stacked substantially perpendicular to said base.

10. The apparatus according to claim 1, wherein said first and second wall are substantially perpendicular to said base.

11. The apparatus according to claim 1, further comprising a stacking roller facilitating staking of items between said first and second walls.

12. The apparatus according to claim 1, further comprising a controller functionally associated with said first and second drives, said controller controlling drives so as to effect a select movement and moved distance of said first and second walls.

13. The apparatus according to claim 12, further comprising a level sensor functionally associated with said controller, said level sensor providing a signal when a select number of items or a select total items thickness is accommodated between said first and second walls.

14. The apparatus according to claim 13, wherein said signal is an empty signal causing said controller to engage said drives, move said first and second walls, and cause said items to drop off said edge and into one of said sections.

15. The apparatus according to claim 4, wherein first and second drives further comprise means for driving said walls such that said items arrive within said section in essential a same formation as when said items were positioned in said receiving area.

16. The apparatus according to claim 4, wherein said conveyor line is inclined with respect to said first and second walls.

17. The apparatus according to claim 5, wherein said roller is substantially perpendicular to said conveyor belt.

18. The apparatus according to claim 4, further comprising a plurality of receiving areas, and wherein each of said plurality of sections is assigned to one of said plurality of receiving areas.

19. The apparatus according to claim 8, wherein said conveyor belt is idle until items from each of said receiving areas are deposited into sections.

20. A method for emptying a stacking tray, comprising the steps of:

receiving items in a receiving area, said area defined by a first and second side driven lateral side wall and base running therebetween, said base further comprising walls defining an edge and a drop;

moving said second wall laterally away from said first wall so as to accommodate newly arriving items in said receiving area;

monitoring when a select number of items or total items thickness is accommodated within said receiving area;

laterally displacing said first and second wall along said base such that items within said receiving area are pushed past said edge and caused to drop from said base when a preselect number of items or total thickness of items is monitored.

21. The method according to claim 20, wherein said step of moving said second wall further comprises the step of moving said second wall so as to maintain a select pressure upon items within said receiving area.

22. The method according to claim 21, further comprising the step of receiving said items dropped from said base in a section of a sectioned conveyor belt, said conveyor belt positioned below said base.

23. The method according to claim 22, wherein said belt comprises a plurality of sections, and said method further comprising the step of moving said conveyor belt after a select number of items have been deposited in a select number of sections.

24. The method according to claim 23, wherein said first and second walls are displaced such that said items drop into said sections in order of receipt at said receiving area and substantially undeformed.

25. The method according to claim 20, wherein said items are mail pieces.

* * * * *